(12) United States Patent
Zheng et al.

(10) Patent No.: US 8,416,871 B2
(45) Date of Patent: Apr. 9, 2013

(54) APPARATUS AND METHOD FOR TRANSMITTING/RECEIVING DATA IN A WIRELESS COMMUNICATION SYSTEM

(75) Inventors: Yan-Xiu Zheng, Zhubei (TW); Yu-Chuan Fang, Yilan (TW)

(73) Assignee: Acer Incorporated, New Taipei (TW)

( * ) Notice: Subject to any disclaimer, the term of this patent is extended or adjusted under 35 U.S.C. 154(b) by 531 days.

(21) Appl. No.: 12/715,410

(22) Filed: Mar. 2, 2010

(65) Prior Publication Data

US 2010/0220799 A1    Sep. 2, 2010

Related U.S. Application Data

(60) Provisional application No. 61/156,720, filed on Mar. 2, 2009.

(51) Int. Cl.
*H04L 5/12* (2006.01)

(52) U.S. Cl. ........ 375/261; 375/260; 375/295; 375/298; 370/210; 370/344; 370/480; 341/173; 341/180; 329/304; 455/91

(58) Field of Classification Search .................. 375/260, 375/261, 295, 298; 370/210, 344, 480; 341/173, 341/180; 329/304; 455/91
See application file for complete search history.

(56) References Cited

U.S. PATENT DOCUMENTS

2003/0072292 A1    4/2003    Yoon et al.
2003/0147474 A1    8/2003    Ha et al.

FOREIGN PATENT DOCUMENTS

| CN | 101291200 | 10/2008 |
|---|---|---|
| GB | 2 391 778 | 2/2004 |
| JP | 2002-199037 | 7/2002 |
| JP | 2003-198503 | 7/2003 |

OTHER PUBLICATIONS

Chinese language office action dated Jul. 4, 2012.
English language translation of abstract of CN 101291200 (published Oct. 22, 2008).
Russian language office action dated Feb. 25, 2011.
English language translation of office action.
Non-Office Action communication dated Mar. 23, 2011.
Japanese language office action dated Jan. 10, 2012.
English language translation of abstract of JP 2002-199037 (published Jul. 12, 2002).
English language translation of abstract of JP 2003-198503 (published Jul. 11, 2003).

*Primary Examiner* — Leon Flores
(74) *Attorney, Agent, or Firm* — McClure, Qualey & Rodack, LLP

(57) ABSTRACT

The present invention discloses a transmission method and apparatus for a wireless communication system. The data transmission method comprises the following steps. A first data mapped in a QAM constellation pattern is transmitted in a first transmission. And a second data, which is reversion of the first data and mapped in said QAM constellation pattern, is retransmitted. In embodiment, the interleaved data is partially swapped based on a predetermined swapping pattern. In another embodiment, first interleaved data and second interleaved data are multiplexed per N bits, N is an integer larger than 1. Therefore, improvement of reliability at first transmission or retransmission in a wireless communication system can be achieved.

3 Claims, 21 Drawing Sheets

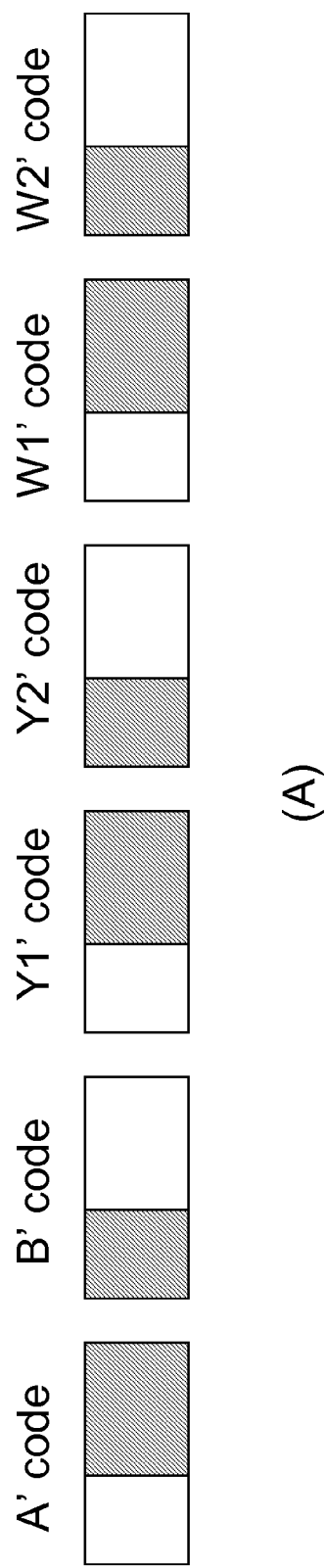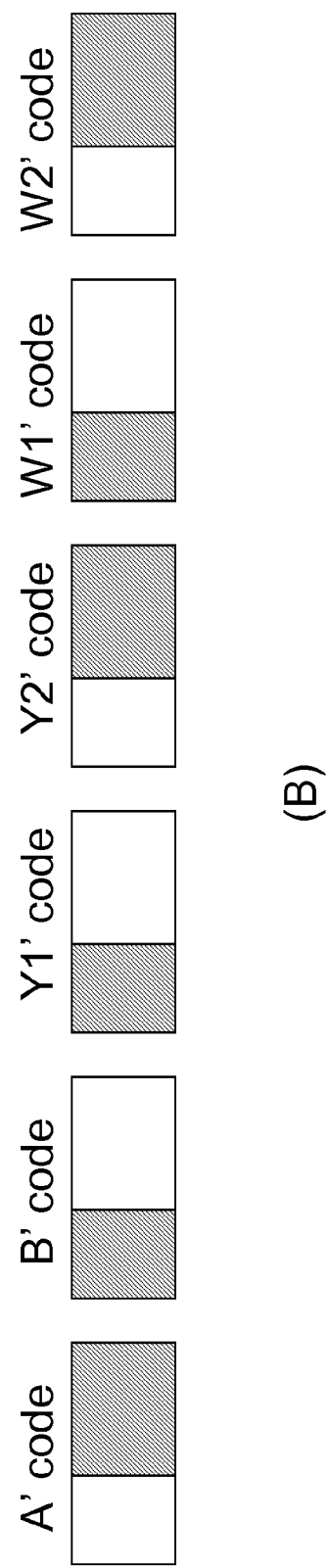
FIG. 18

APPARATUS AND METHOD FOR TRANSMITTING/RECEIVING DATA IN A WIRELESS COMMUNICATION SYSTEM

TECHNICAL FIELD

The present invention relates generally to an apparatus and method for transmitting/receiving data in a wireless communication system, more particularly, related to an apparatus and method for improve reliability at data transmission.

BACKGROUND

On wireless high-speed, high-quality data services, it is very difficult in practice to receive pure signals without signal distortion or noise. Adverse influences are attributed to a radio channel environment in a wireless communication system. For a wireless communication system, the radio channel environment varies frequently because of white noise, fading-incurred signal power changes, shadowing and interference from other users and multi-path signals. If the data is received in a mobile terminal, the influence further includes the Doppler Effect that occurs due to the movement and frequent velocity changes of a terminal.

Accordingly, great amounts of time and energy have been expended toward minimizing the influence of distortion or noise involved with signal transmission and reception in a wireless communication system. Common techniques in communication systems with unreliable and time-varying channel conditions are AMCS (Adaptive Modulation & Coding Scheme) and HARQ (hybrid automatic repeat request).

AMCS adjusts a modulation order and a coding rate according to changes in downlink channel condition. The downlink channel quality is usually evaluated by measuring the SNR (Signal-to-Noise Ratio) of a received downlink signal at a UE (User Equipment). The UE feeds back the channel quality information to a BS (Base Station) on an uplink. Then the BS estimates the downlink channel condition based on the channel quality information and determines an appropriate modulation scheme and coding rate for a channel encoder according to the downlink channel condition estimate.

HARQ is a retransmission control technique, which is to correct errors in initially transmitted data packets based on automatic repeat request (ARQ) schemes together with a forward error correction (FEC) technique. Schemes for implementing HARQ include chase combining (CC), full incremental redundancy (FIR), and partial incremental redundancy (PIR).

FIG. 1 is a block diagram of a transmitter/receiver in a typical high-speed wireless data packet communication system. Referring to FIG. 1, the transmitter 100 includes an encoder 110, a channel interleaver 120 and a modulator 130. Upon input of information bits, the encoder 110 is operable to encode the information bits at a predetermined coding rate. If coding rate R (=n/k, n is prime to k.) is set to, for example, ½ or ¾, the encoder 110 outputs n coded bits for the input of k information bits. The burst errors, which are often generated on a fading channel, can be prevented by interleaving. The channel interleaver 120 performs interleaving to distribute coded bits having the same information to overcome the shortcoming of the error control coding, and to minimize data loss caused by burst errors. The modulator 130 modulates the interleaved bits in a predetermined modulation scheme, such as QPSK, 8PSK, 16QAM, and 64QAM. The modulated data is transmitted over the communication channel 190. The communication channel is typically a radio communication channel experiencing unreliable and time-varying channel conditions. Preferably, the transmitter 100 can further include a controller to select the coding rate for the encoder 110, and modulation scheme for modulator 130.

The receiver 101 includes a decoder 160, a deinterleaver 150 and a demodulator 140. The demodulator 140 demodulates the received data into a corresponding bit domain sequence. The deinterleaver 150 performs deinterleaving the bit sequence from the demodulator 140, by applying a determined, pseudo-random or random permutation of the input bit sequences which is applied by the interleaver 120. The decoder 160 then decodes the deinterleaved data to output the information bits.

As stated before, the modulator 140 supports various modulation schemes including QPSK, 8PSK, 16QAM and 64QAM with respect to the interleaved bits. In modulator 140, an interleaved data mapped on a modulation symbol, and the symbol mapping refers to designation of symbol positions in a two-dimensional symbol constellation having an I channel along an X axis and a Q channel along a Y axis. As a modulation order increases, the number of bits in one modulation symbol increases. Bits mapped to one modulation symbol have different transmission reliabilities according to their positions. With regard to transmission reliability, two bits of a modulation symbol representing a macro region defined by left/right and up/down have a relatively high reliability in an I (In Phase)-Q (Quadrature Phase) signal constellation. The other bits representing a micro region within the macro region have a relatively low reliability.

FIG. 2 illustrates an exemplary signal constellation in 16QAM. Referring to FIG. 2, one 16QAM modulation symbol contains 4 bits [a3, a2, a1, a0] in a reliability pattern [H, L, H, L] (H denotes high reliability and L denotes low reliability). That is, the two bits [a1, a3] have a relatively high reliability, and the two bits [a0, a2], a relatively low reliability. FIG. 3 illustrates an exemplary signal constellation in 64QAM. Referring to FIG. 3, one 64QAM modulation symbol contains 6 bits [a5, a4, a3, a2, a1, a0] in a reliability pattern [H, M, L, H, M, L] (M denotes medium reliability).

In conventional HARQ, however, initial transmission bits and their retransmission bits are the same in reliability. Bits mapped to a low reliability position still have the low reliability at retransmission and the same occurs to bits mapped to a high reliability.

In IEEE 802.16 standard, one of the forward error correction (FEC) schemes is duo-binary turbo code called convolutional turbo code (CTC). FIG. 4 illustrates a block diagram of conventional CTC encoder. CTC encoder 400 comprises a CTC interleaver 410, a first constituent encoder 421 and a second constituent encoder 422. Upon input of A code and B code, the CTC encoder 400 outputs six code groups including A code, B code, Y1 code, W1 code, Y2 code and W2 code, wherein A code and B code are systematic parts. $Y_1$ code and $W_1$ code are the parity parts generated by the first convolutional encoder 421. $Y_2$ and $W_2$ are the parity parts generated by the second convolutional encoder 422.

FIG. 5 illustrates a schematic view of conventional channel interleaving scheme for CTC encoder. The channel interleaver performs following operations: bit separation 51, subblock interleaving 52, bit grouping 53 and bit selection 54. In operation of bit separation 51, the encoded bits outputted from CTC encoder 400 are sequentially distributed into six subblocks. A code subblock 551, B code subblock 552, Y1 code subblock 553, Y2 code subblock 554, W1 code subblock 555 and W2 code subblock 556. These six subblocks are respectively inputted to subblock interleaver 591, 592, 593, 594, 595 and 596 in operation of subblock interleaving 52. In bit grouping 53, the interleaved A and B subblock sequences are grouped directly, $Y_1$ and $Y_2$ subblock sequences are bit-by-bit multiplexed, and $W_1$ and $W_2$ subblock sequences are bit-by-bit multiplexed. In bit selection, the grouped bits are selected continuously and circularly to generate subblocks and fed to the modulator.

However, this channel interleaving scheme has some disadvantages. First, some contiguous coded bits are mapped onto the bit location with the same level of reliability on the constellation. Besides, when 16-QAM is considered, subblocks $Y_1$ ($W_1$) and $Y_2$ ($W_2$) are always mapped into more and less reliable bit location respectively, as shown in FIG. 6. Third, the reliability distribution of systematic and parity bits corresponding to the same information bit is not uniform.

SUMMARY OF THE INVENTION

Therefore, an object of the present invention is to provide a transmission apparatus and method, so as to improve reliability at first transmission or retransmission in a wireless communication system.

The object of the present invention can be achieved by providing a transmission method for retransmitting in a transmitter of a wireless communication system, and the method comprises the steps of transmitting a first data mapped in a QAM constellation pattern in a first transmission, and retransmitting a second data mapped in the QAM constellation pattern in a retransmission. The second data is reversion of the first data.

The object of the present invention can be achieved by providing a transmission method for retransmitting in a transmitter of a wireless communication system, and the method comprises steps of transmitting a bit sequence (b3, b2, b1, b0) mapped in a 16 QAM constellation pattern in a first transmission; upon receiving a retransmission request, performing a rearrangement by swapping b3 and b1 with b2 and b0, to generate a rearranged bit sequence (b2, b3, b0, b1); retransmitting the rearranged bit sequence mapped in said QAM constellation pattern in a retransmission.

The object of the present invention can be achieved by providing a transmission method for retransmitting in a transmitter of a wireless communication system, and the method comprises steps of transmitting a bit sequence (b5, b4, b3, b2, b1, b0) mapped in a 64 QAM constellation pattern in a first transmission; upon receiving a retransmission request, performing a rearrangement by swapping b5, b3 and b1 with b4, b2 and b0, to generate a rearranged bit sequence (b4, b5, b2, b3, b0, b1); retransmitting said rearranged bit sequence mapped in said 64 QAM constellation pattern in a retransmission.

The object of the present invention can be achieved by providing a transmission method for retransmitting in a transmitter of a wireless communication system, and the method comprises steps of transmitting a bit sequence (b5, b4, b3, b2, b1, b0) mapped in a 64 QAM constellation pattern in a first transmission; upon receiving a retransmission request, performing a rearrangement by swapping b5, b2 with b3 and b0, to generate a rearranged bit sequence (b3, b4, b5, b0, b1, b2); retransmitting said rearranged bit sequence mapped in said QAM constellation pattern in a retransmission.

The object of the present invention can be achieved by providing a transmission apparatus capable of retransmitting in a wireless communication system. The apparatus comprises an encoder, a channel interleaver, a modulator and a transmitter. The encoder is capable of encoding input data and outputting coded bits. The channel interleaver is capable of interleaving the coded bits to generating interleaved bits, and reversing said interleaved bits upon receiving a retransmission request from a receiver. The modulator is capable of mapping said reversed bits to modulation symbols in a predetermined modulation scheme.

The object of the present invention can be achieved by providing a transmission apparatus capable of retransmitting in a wireless communication system. The apparatus comprises an encoder, a channel interleaver, a bit swap unit, a modulator and a transmitter. The encoder is capable of encoding input data and outputting coded bits. The channel interleaver is capable of interleaving the coded bits to generate interleaved bits. The bit swap unit is capable of swapping the interleaved bits to generate swapped bits, upon receiving a retransmission request from a receiver. The modulator is capable of mapping the swapped bits to modulation symbols in a predetermined modulation scheme. The transmitter is capable of transmitting the modulation symbols to said receiver.

The object of the present invention can be achieved by providing a transmission method comprising steps of: encoding input data to generate an encoded data containing first coded bits; interleaving said first coded bits to generate first interleaved bits; partially swapping said first coded bits to generate processed bits; mapping said interleaved bits to modulation symbols in a predetermined modulation scheme; transmitting the modulation symbols.

The object of the present invention can be achieved by providing a transmission apparatus, comprising an encoder, a channel interleaver, a partially swap unit, a modulator and a transmitter. The encoder is capable of encoding input data to generate first coded bits and second coded bits. The channel interleaver is capable of interleaving said first coded bits and said second coded bits, to generate first interleaved coded bits and second interleaved coded bits. The partially swap unit is capable of partially swapping said first interleaved coded bits to generate partially swapped first interleaved coded bits, and combining said partially swapped said first interleaved coded bits and said second interleaved coded bits to generate processed bits. The modulator is capable of mapping said processed bits to modulation symbols in a predetermined modulation scheme. The transmitter is capable of transmitting the modulation symbols.

The object of the present invention can be achieved by providing a transmission method comprising steps of encoding input data to generate first coded bits and second coded bits; multiplexing said first coded bits and said second coded bits per N bits, N is an integer larger than 1, to form processed bits; mapping said processed bits to modulation symbols in a predetermined modulation scheme; transmitting the modulation symbols.

The object of the present invention can be achieved by providing a transmission apparatus comprising an encoder, a channel interleaver, a modulator and a transmitter. The encoder is capable of encoding input data to generate first coded bits and second coded bits. The channel interleaver is capable of interleaving said first coded bits and said second coded bits to generate said first interleaved coded bits and said second interleaved coded bits, and multiplexing said first interleaved coded bits and said second interleaved coded bits per N bits, N is an integer larger than 1, to form processed bits. The modulator is capable of mapping said processed bits to modulation symbols in a predetermined modulation scheme. The transmitter is capable of transmitting the modulation symbols.

BRIEF DESCRIPTION OF THE DRAWINGS

The accompanying drawings, which are included to provide a further understanding of the invention, illustrate embodiments of the invention and together with the description serve to explain the principle of the invention.

FIG. 18 illustrates an example of partially swapping scheme the present invention applied in the CTC encoder;

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 7:
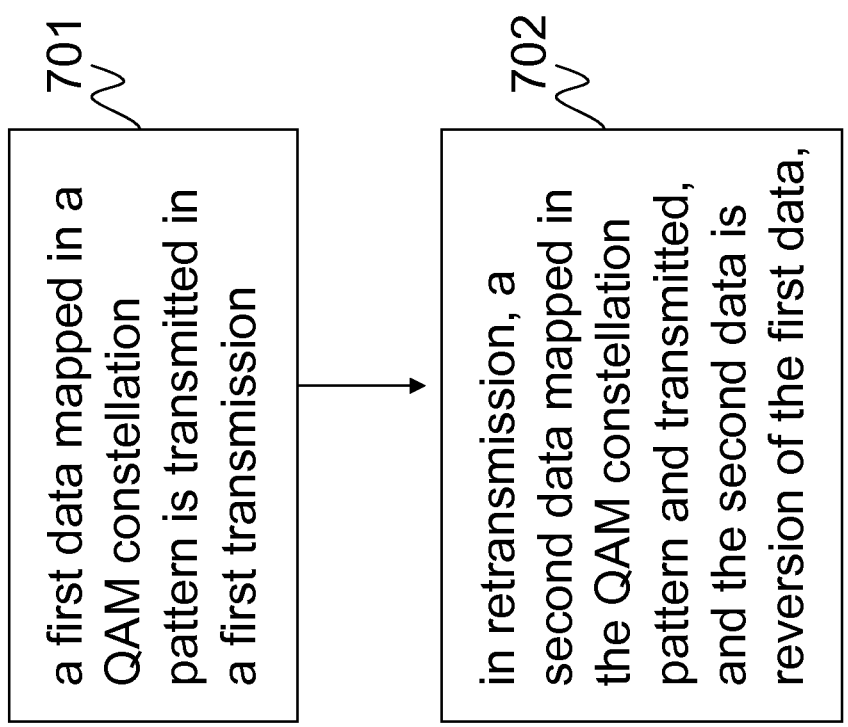
FIG. 7 illustrates a flow chart of first embodiment of transmission method in accordance with the present invention.

FIG. 7 illustrates a flow chart of first embodiment of transmission method in accordance with the present invention. This first embodiment comprises the following steps. In step 701 a first data mapped in a QAM constellation pattern is transmitted in a first transmission. And in retransmission, a second data which is reversion of said first data, is mapped in the QAM constellation pattern and transmitted. Preferably, the QAM constellation pattern is a 16 QAM constellation pattern, and the first data is bit sequence (b3, b2, b1, b0) and the second data is a bit sequence (b0, b1, b2, b3). While modulation symbol of the 16 QAM constellation pattern contains 4 bits [a3, a2, a1, a0] and bits [a3, a1] have a high reliability and bits [a2, a0] have a low reliability, then bits [b2, b0] of data, which are mapped to low reliability location in 16 QAM constellation pattern in first transmission, can be mapped to high reliability location in retransmission.

Preferably, the QAM constellation pattern can be a 64 QAM constellation pattern, and the first data is a bit sequence (b5, b4, b3, b2, b1, b0) and the second data is a bit sequence (b0, b1, b2, b3, b4, b5). While modulation symbol of the 64 QAM constellation pattern contains 6 bits [a5, a4, a3, a2, a1, a0] and bits [a5, a2] have a high reliability and bits [a4, a1] have a medium reliability and bits [a3, a0] have a low reliability, then bits [b3, b0] of data, which are mapped to low reliability location in 64 QAM constellation pattern in first transmission, can be mapped to high reliability location in retransmission. Therefore, reliability at data retransmission can be improved efficiently.

Figure 1:
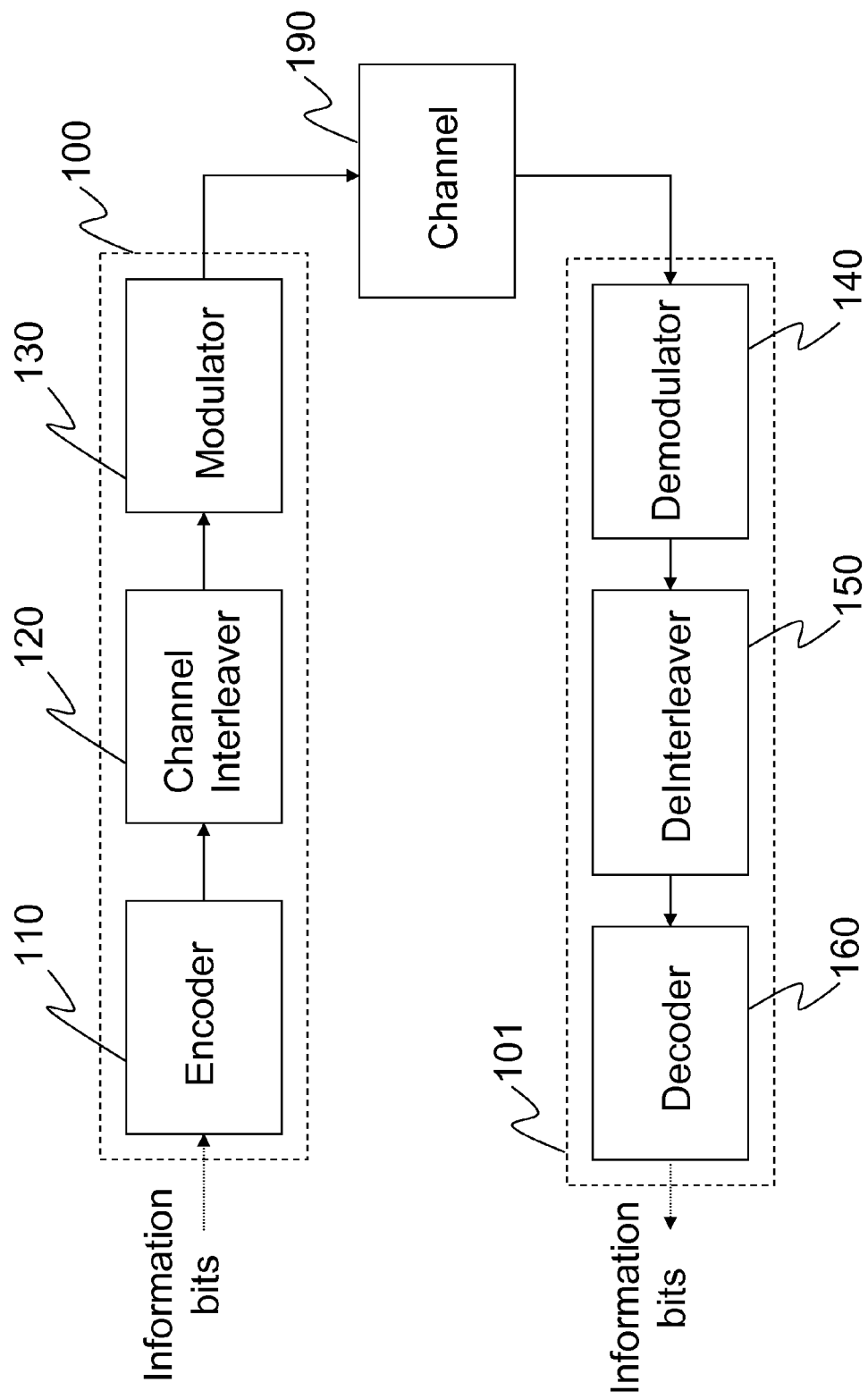
FIG. 1 illustrates a block diagram of an exemplary transmitter and receiver in accordance with the present invention.
Figure 2:
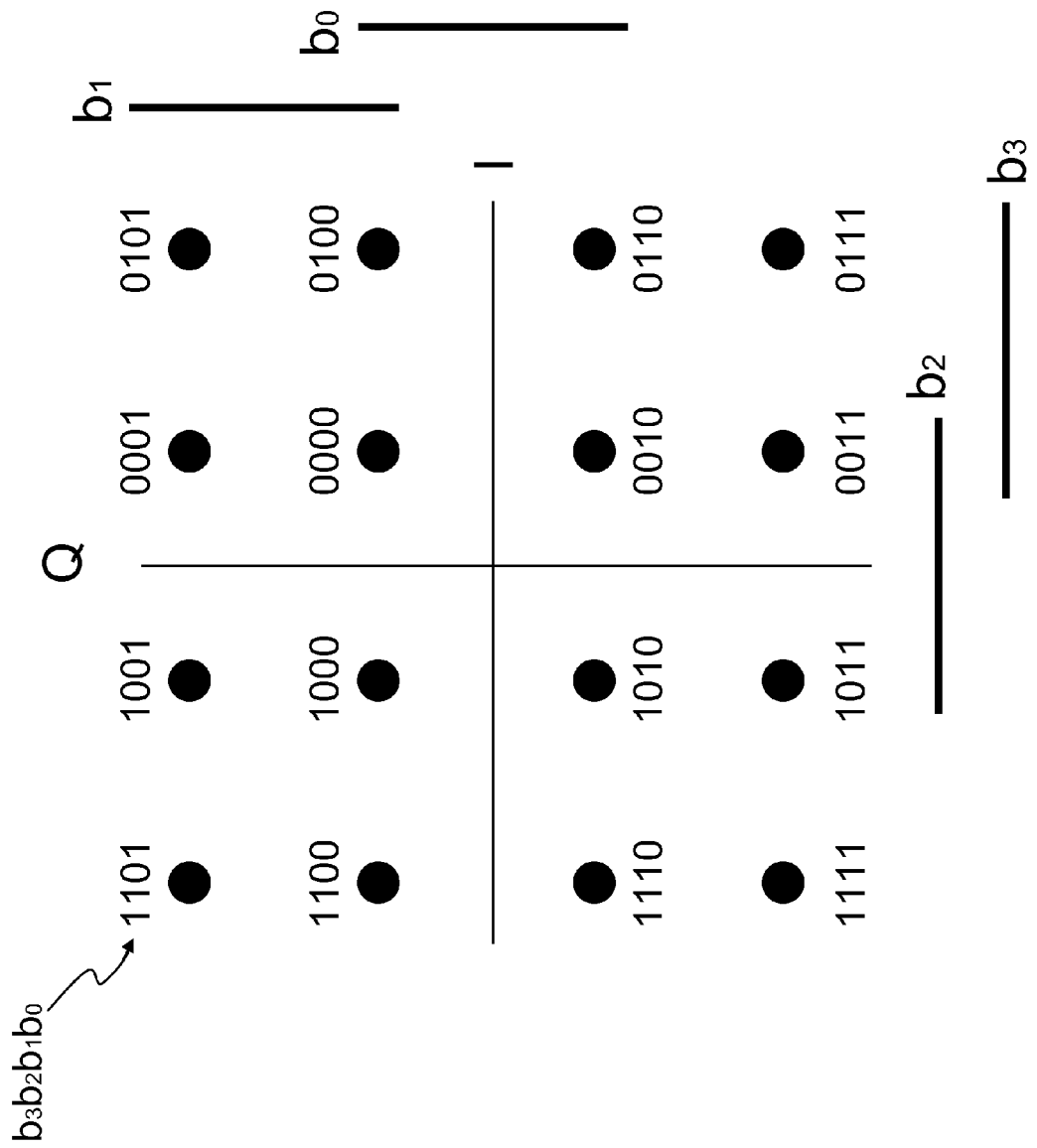
FIG. 2 illustrates an exemplary signal constellation in 16QAM.
Figure 3:
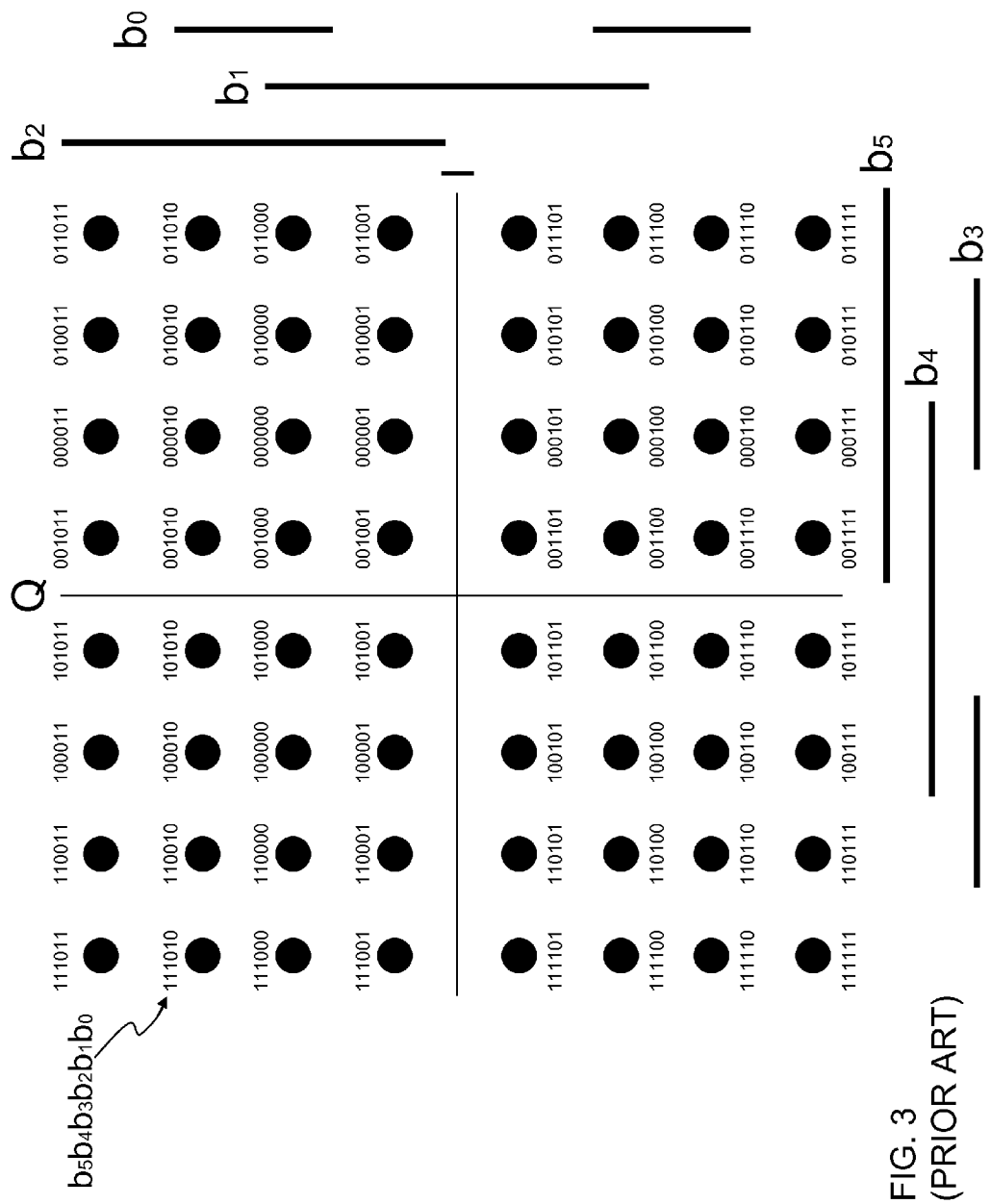
FIG. 3 illustrates an exemplary signal constellation in 64QAM.
Figure 4:
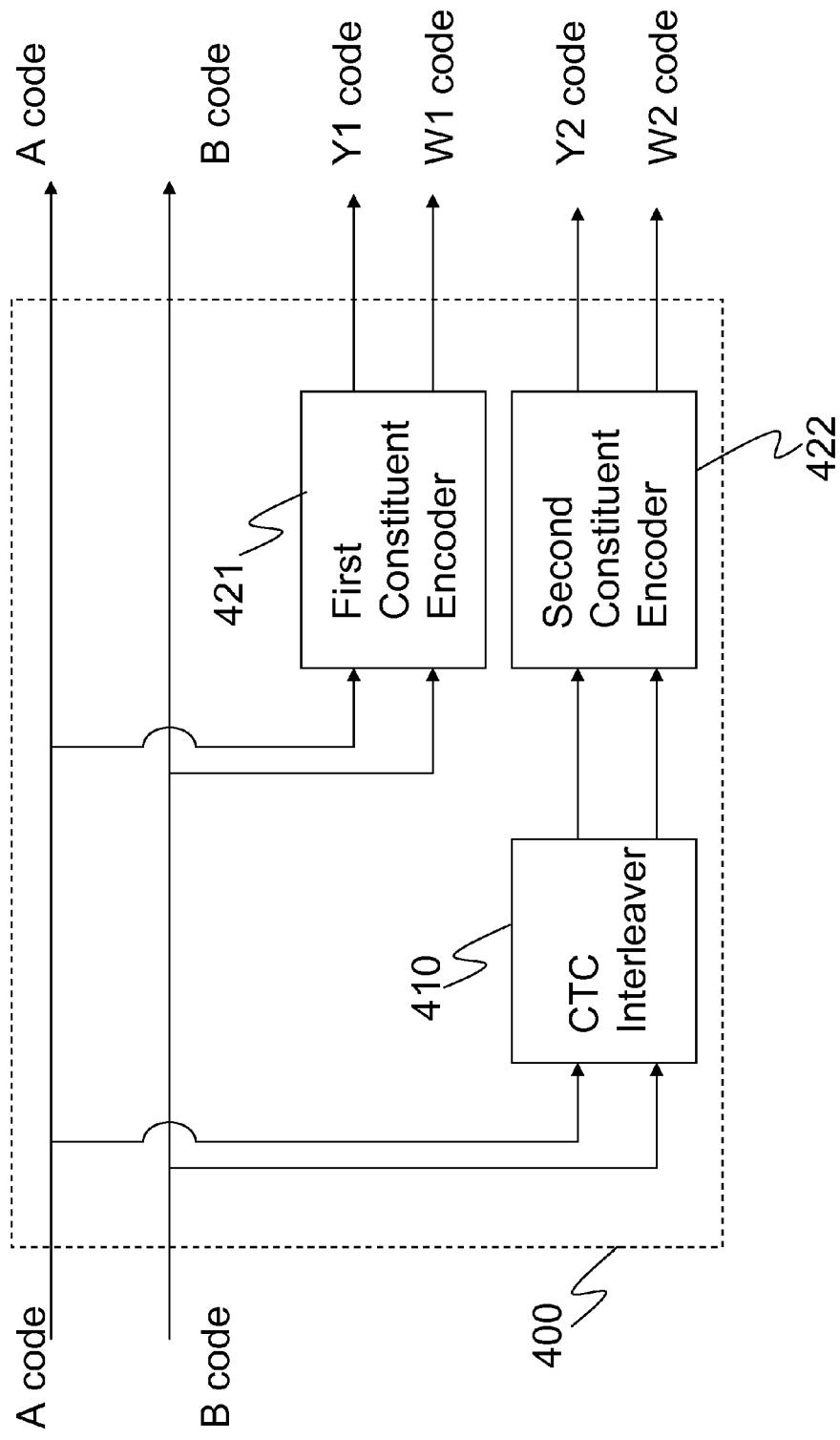
FIG. 4 illustrates a block diagram of conventional CTC encoder.
Figure 5:
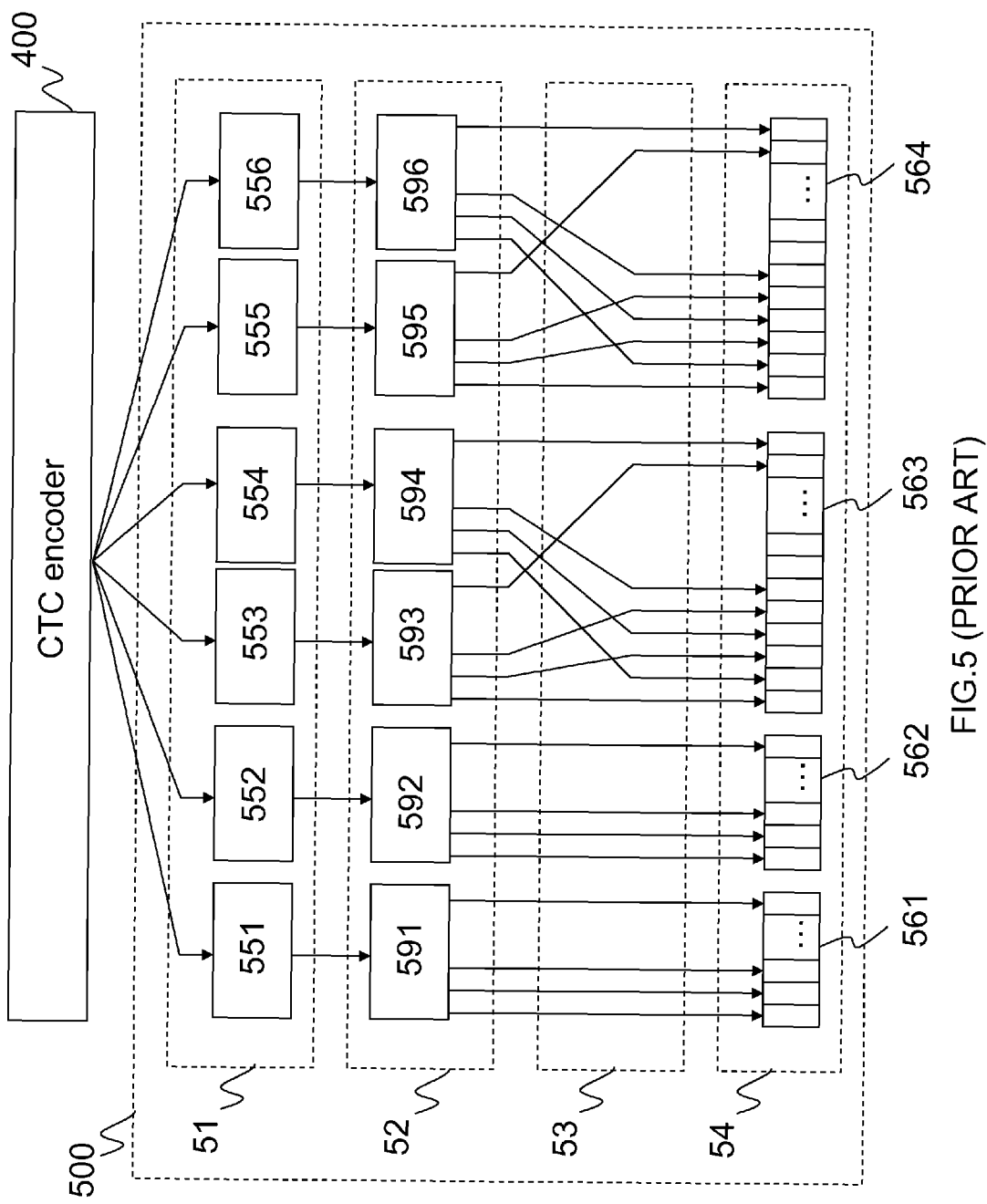
FIG. 5 illustrates a schematic view of conventional channel interleaving scheme for CTC encoder.
Figure 6:
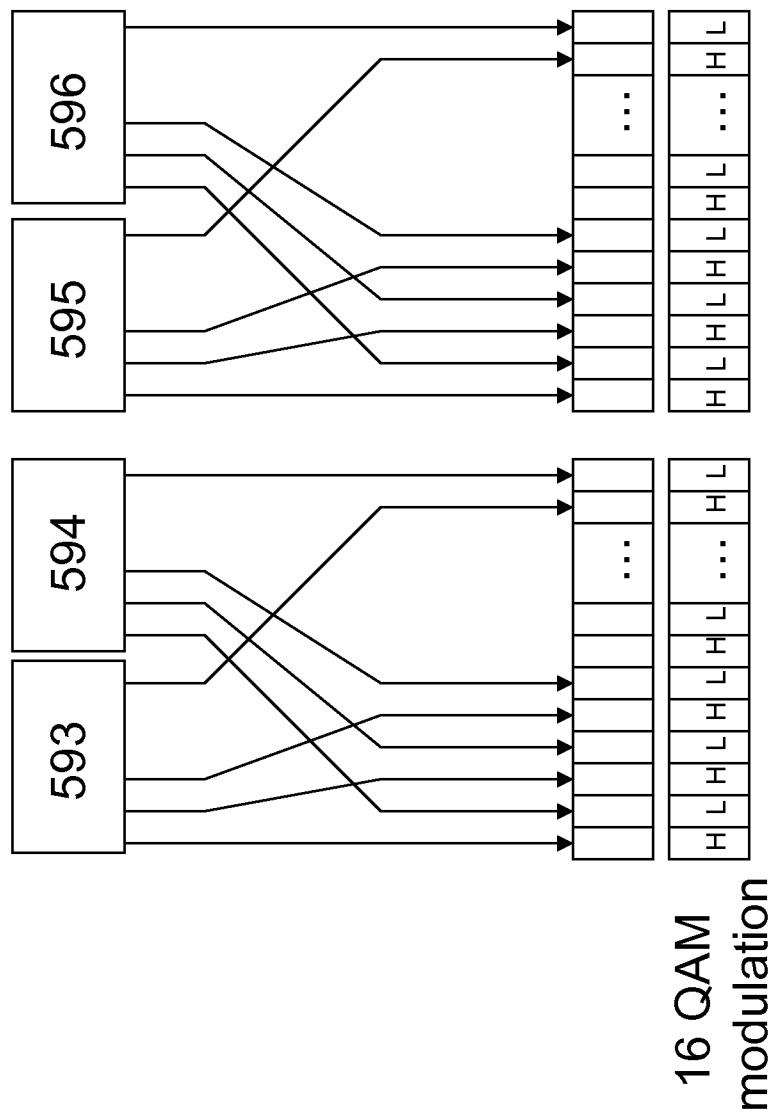
FIG. 6 illustrates a schematic view of reliability of code bit by 16 QAM in conventional channel interleaving scheme.
Figure 8:
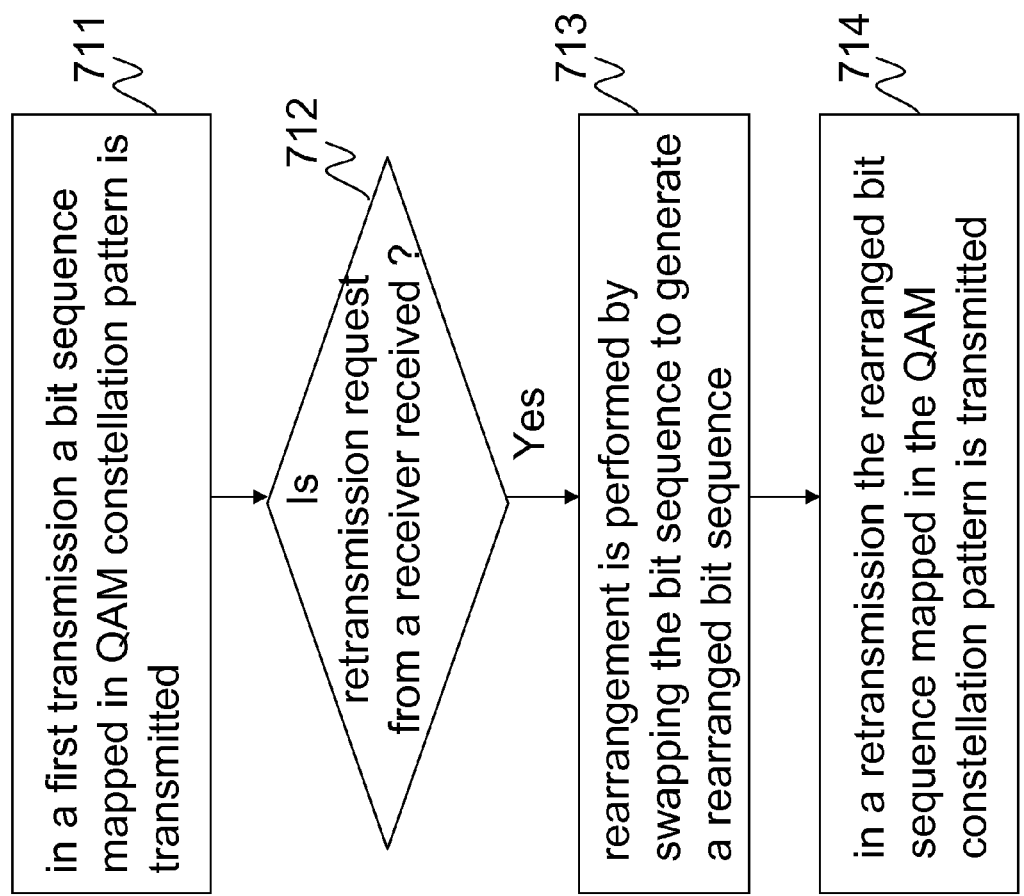
FIG. 8 illustrates a flow chart of second embodiment of transmission method in accordance with the present invention.

FIG. 8 illustrates a flow chart of second embodiment of transmission method in accordance with the present invention. As shown in FIG. 2, second embodiment comprises the following steps. In step 711, in a first transmission a bit sequence mapped in a QAM constellation pattern is transmitted. In step 712, it is determined whether a retransmission request from a receiver is received. If such retransmission request is received, a rearrangement is performed by swapping the bit sequence to generate a rearranged bit sequence in step 713. In step 714, in a retransmission the rearranged bit sequence mapped in the QAM constellation pattern is transmitted.

Figure 9:
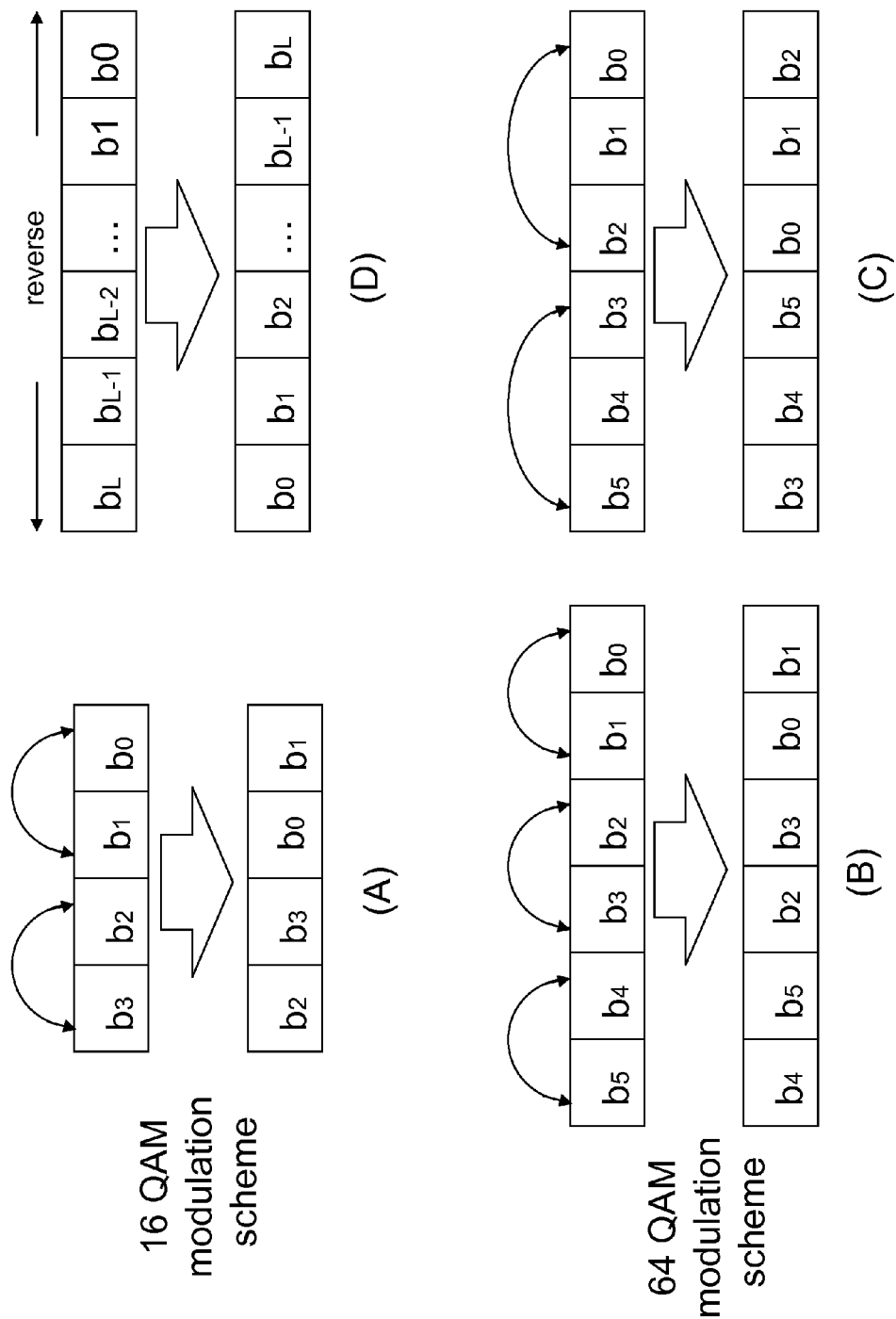
FIG. 9 illustrates examples of bit swap scheme in accordance with the present invention.

FIG. 9 illustrates examples of bit swap scheme in accordance with the present invention. In 16 QAM constellation pattern, the bit sequence (b3, b2, b1, b0) 721 is rearranged by swapping b3 and b1 with b2 and b0 in step 713, to generate the rearranged bit sequence (b2, b3, b0, b1) 722, as shown the example (A) in FIG. 9.

In 64 QAM constellation pattern, the bit sequence (b5, b4, b3, b2, b1, b0) 723 is rearranged by swapping b5, b3 and b1 with b4, b2 and b0 in step 713, to generate a rearranged bit sequence (b4, b5, b2, b3, b0, b1) 724, as shown the example (B) in FIG. 9. In another example, the bit sequence (b5, b4, b3, b2, b1, b0) 723 can be rearranged by swapping b5, b2 with b3 and b0 in step 713, to generate the rearranged bit sequence (b3, b4, b5, b0, b1, b2) 725, as shown the example (C) in FIG. 9.

Preferably, the rearrangement can be performed by reversing the bit sequence. As shown the example (D) in FIG. 9, the rearranged bit sequence $(b_0, b_1, \ldots, b_{L-2}, b_{L-1}, b_L)$ 725 is the reversion of the bit sequence $(b_L, b_{L-1}, b_{L-2}, \ldots, b_1, b_0)$ 726, L is a positive integer larger than 2.

Figure 10:
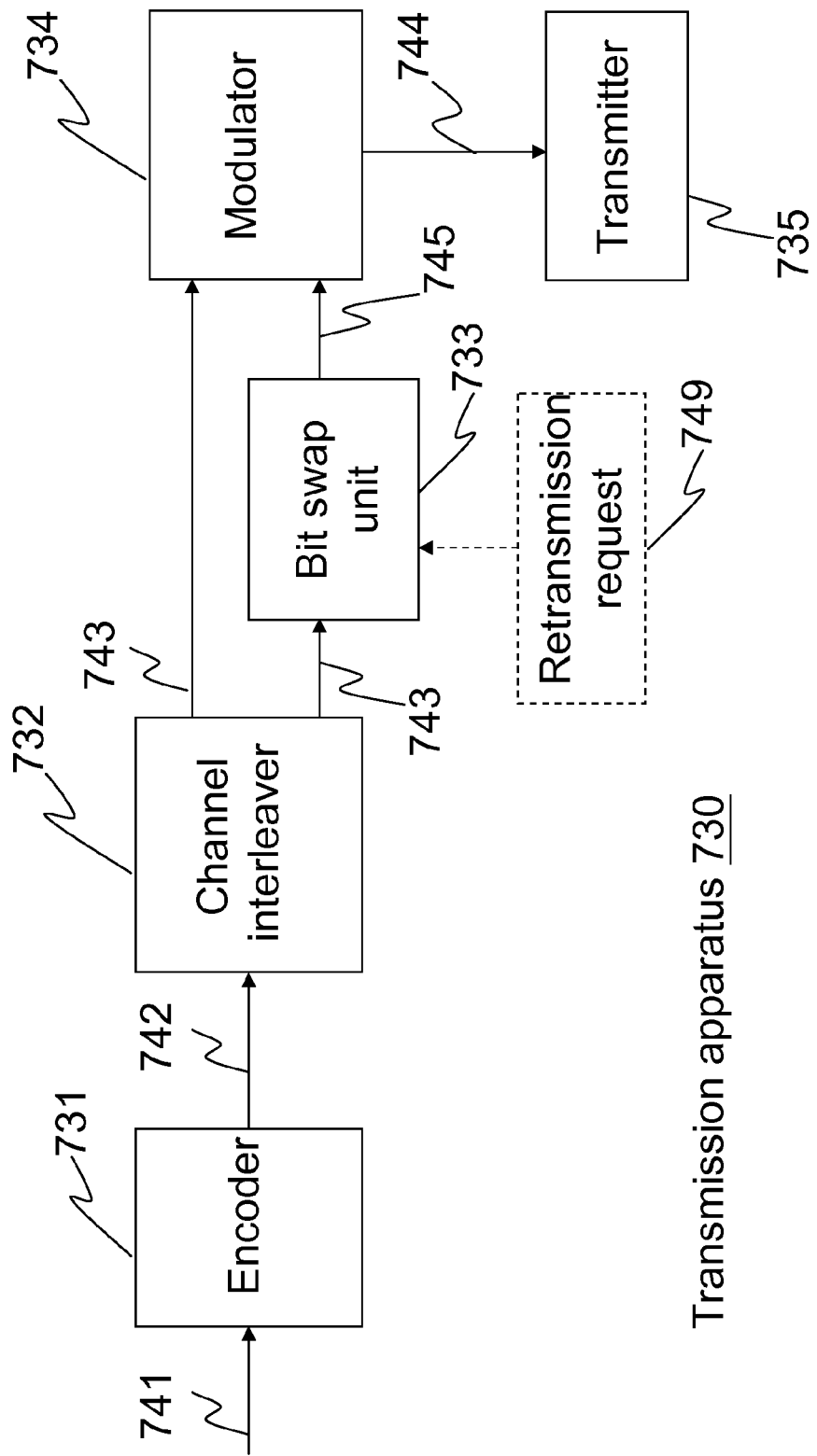
FIG. 10 illustrates a block diagram of first embodiment of transmission data in accordance with the present invention.

FIG. 10 illustrates a block diagram of first embodiment of transmission data in accordance with the present invention. The transmission apparatus 730 comprises an encoder 731, a channel interleaver 732, a bit swap unit 733, a modulator 734 and a transmitter 735. The encoder 731 is operable to encode input data 741 and outputting coded bits 742. The channel interleaver 732 is operable to interleave the coded bits 742 to generate interleaved bits 743. In first transmission, the modulator 734 is operable to map the interleaved bits 743 to modulation symbols 744 in a predetermined modulation scheme and the modulation symbols 744 is then transmitted by transmitter 735.

While the transmission apparatus 730 receives a retransmission request 729 from a receiver, the bit swap unit 733 swaps the interleaved bits 743 to generate swapped bits 745, and modulator 734 maps the swapped bits 745 to modulation symbols 744 in the predetermined modulation scheme. The transmitter 735 transmits the modulation symbols 744 to the receiver. Preferably, the predetermined modulation scheme is a 16QAM modulation scheme or a 64QAM modulation scheme. The bit swap scheme operated by bit swap unit 733 is described in preceding paragraph, so not explain in detail again. Preferably, the bit swap unit 733 can be implemented inside the channel interleaver 732, and bit swap scheme is also executed by the channel interleaver 732.

Figure 11:
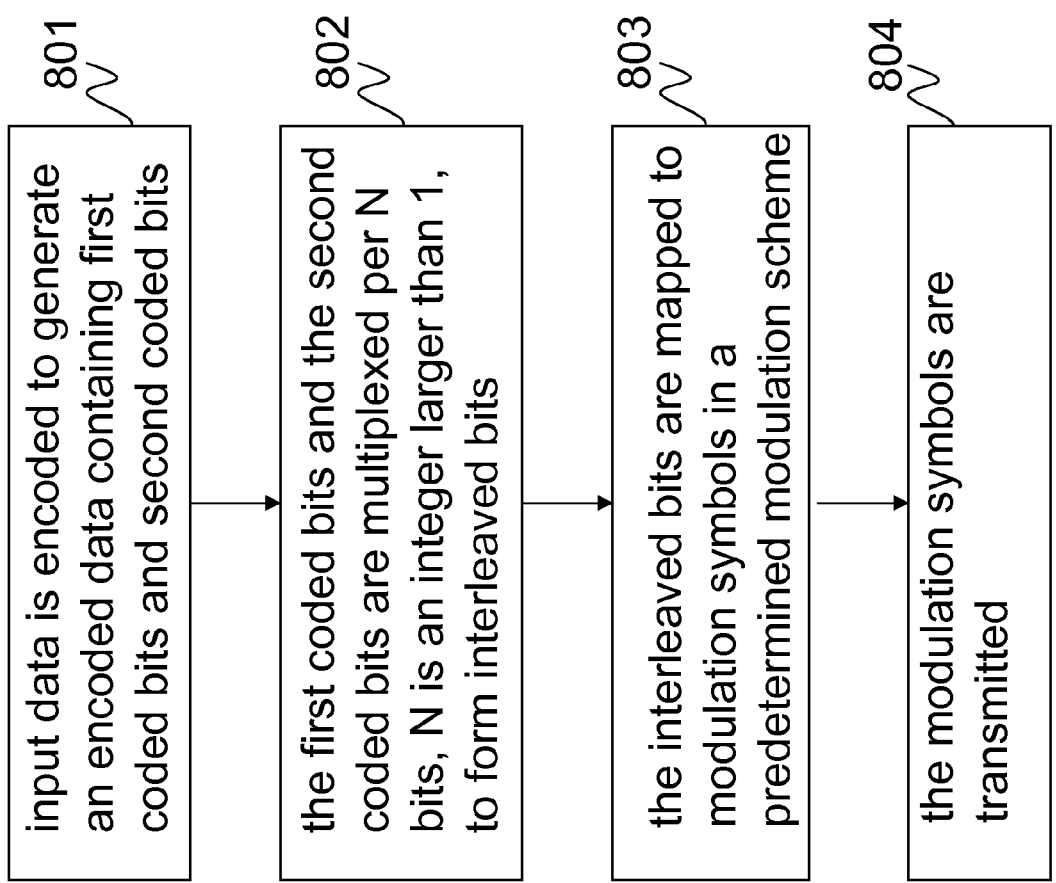
FIG. 11 illustrates a flow chart of third embodiment of transmission method in accordance with the present invention.

FIG. 11 illustrates a flow chart of third embodiment of transmission method in accordance with the present invention. The third embodiment comprises the following steps. In step 801, input data is encoded to generate an encoded data containing first coded bits and second coded bits. In step 802, the first coded bits and the second coded bits are multiplexed per N bits, N is an integer larger than 1, to form interleaved bits. In step 803, the interleaved bits are mapped to modulation symbols in a predetermined modulation scheme, and the modulation symbols are transmitted in step 804. Preferably, N can be 2 or 6 when the predetermined modulation scheme is 16QAM modulation scheme; N can be 3 or 6 when the predetermined modulation scheme is 64QAM modulation scheme.

Figure 12:
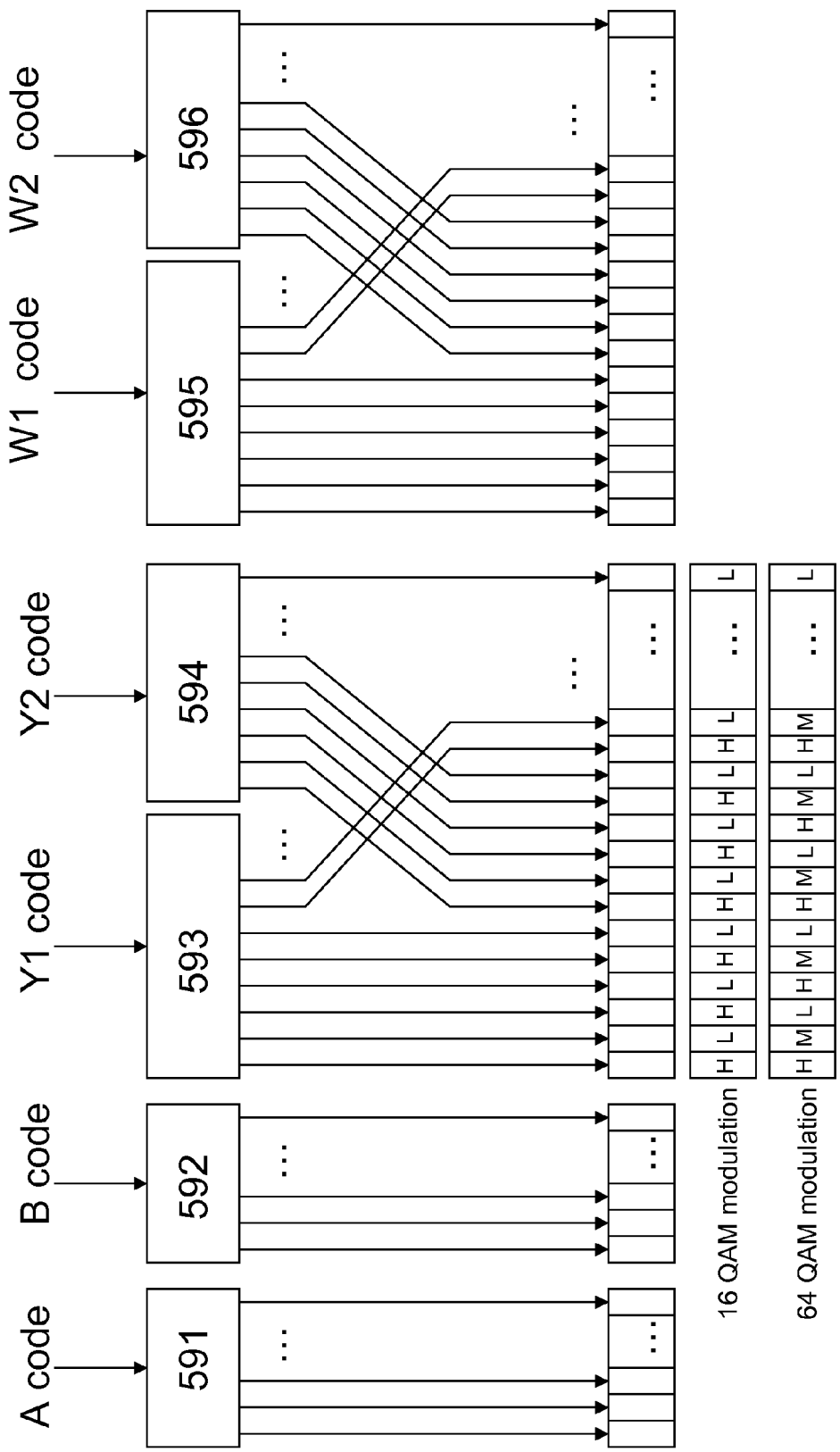
FIG. 12 illustrates a first example of multiplexing scheme of transmission method in accordance with the present invention.

FIG. 12 illustrates a first example of multiplexing scheme of transmission method in accordance with the present invention. In FIG. 12, such multiplexing scheme is applied in CTC encoder, the data outputted from the subblock interleaver 593 corresponding to Y1 code is multiplexed with the data outputted from the subblock interleaver 594 corresponding to Y2 code per 6 bits. Similarly, the data outputted from the subblock interleaver 595 corresponding to W1 code is multiplexed with the data outputted from the subblock interleaver 596 corresponding to W2 code per 6 bits. Therefore, the Y1 code, Y2 code, W1 code, W2 code under multiplexing scheme of the present invention can have more uniform reliability in transmission in 16 QAM modulation scheme or 64 QAM modulation scheme.

Figure 13:
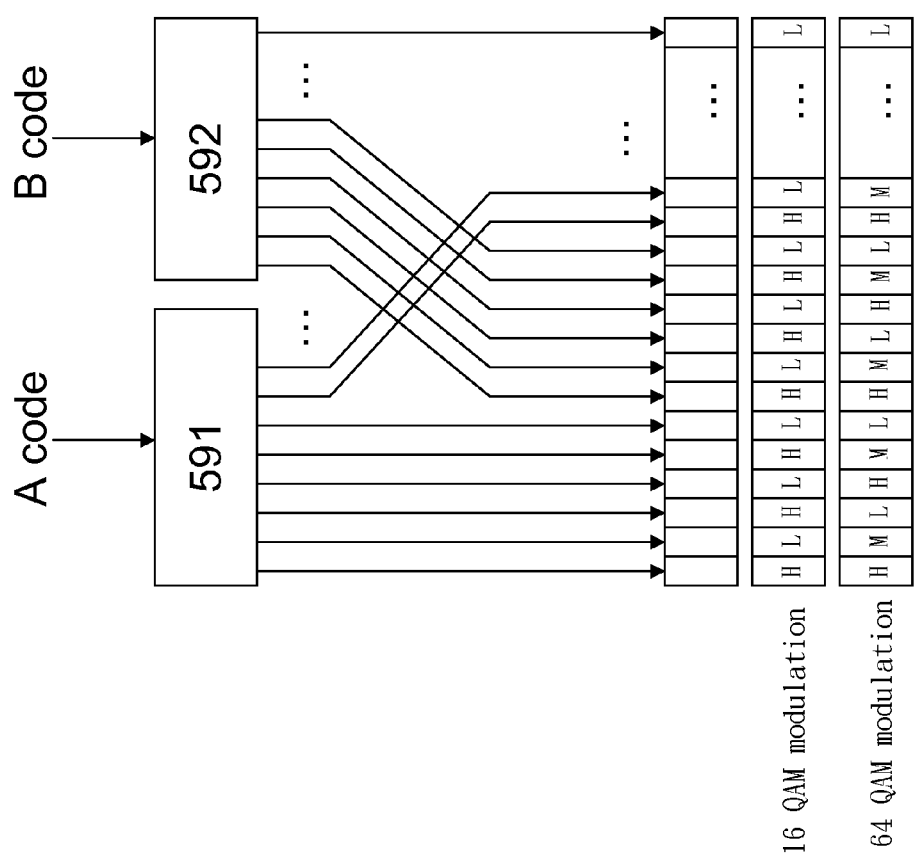
FIG. 13 illustrates a second example of multiplexing scheme of transmission method in accordance with the present invention.

FIG. 13 illustrates a second example of multiplexing scheme of transmission method in accordance with the present invention. In this example, the data outputted from the subblock interleaver 591 corresponding to A code and the data outputted from the subblock interleaver 592 corresponding to B code are multiplexed per 6 bits, so that the systematic (A code and B code) and parity bits (Y1 code, Y2 code, W1 code and W2 code) can have more uniform reliability in transmission.

Figure 14:
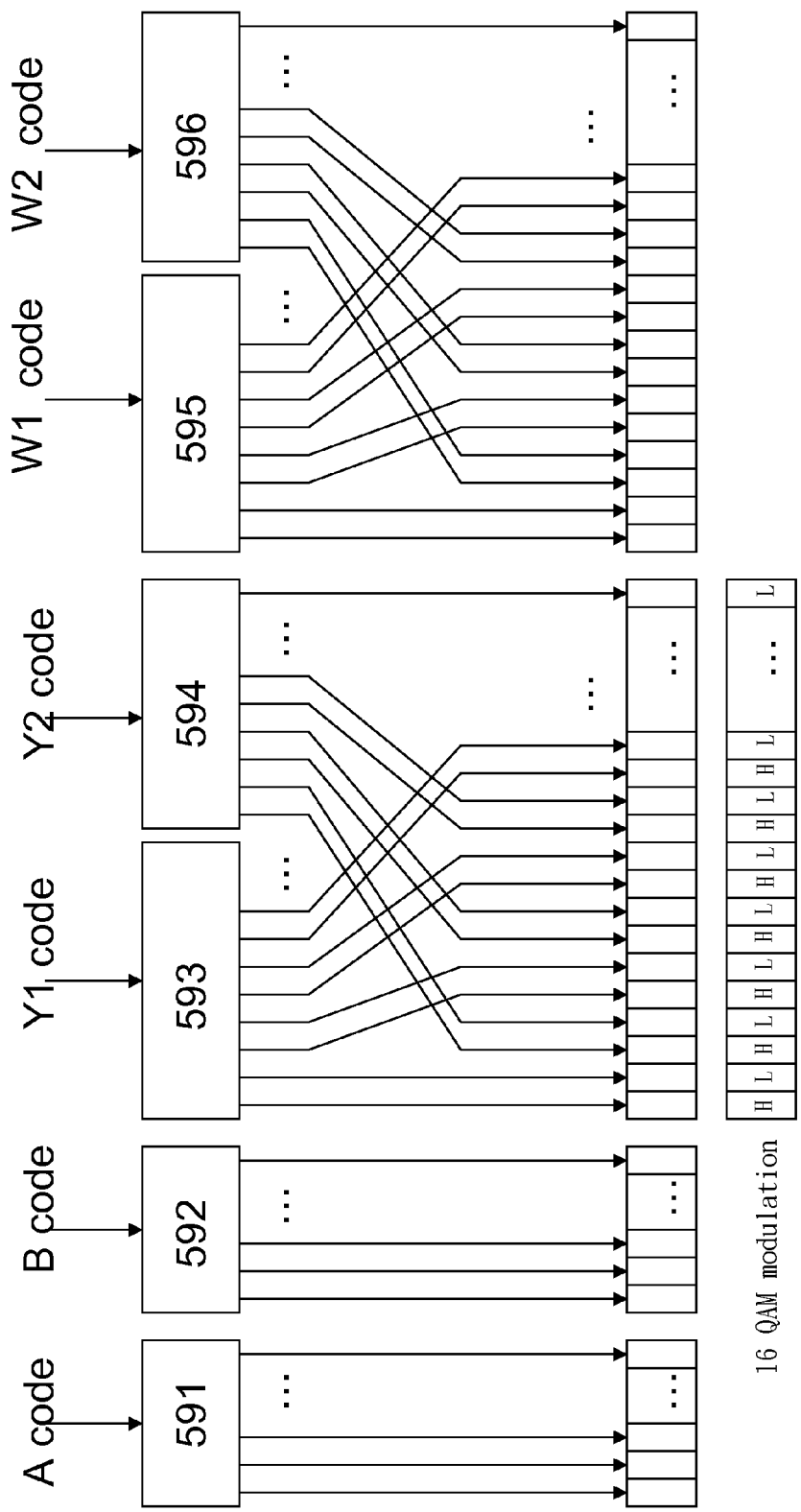
FIG. 14 illustrates a third example of multiplexing scheme of transmission method in accordance with the present invention.

FIG. 14 illustrates a third example of multiplexing scheme of transmission method in accordance with the present invention. In FIG. 14, such multiplexing scheme is applied in CTC encoder, the data outputted from the subblock interleaver 593 corresponding to Y1 code is multiplexed with the data outputted from the subblock interleaver 594 corresponding to Y2 code per 2 bits. Similarly, the data outputted from the subblock interleaver 595 corresponding to W1 code is multiplexed with the data outputted from the subblock interleaver 596 corresponding to W2 code per 2 bits. Therefore, the Y1 code, Y2 code, W1 code, W2 code under multiplexing scheme of the present invention can have more uniform reliability in transmission in 16 QAM modulation scheme.

Figure 15:
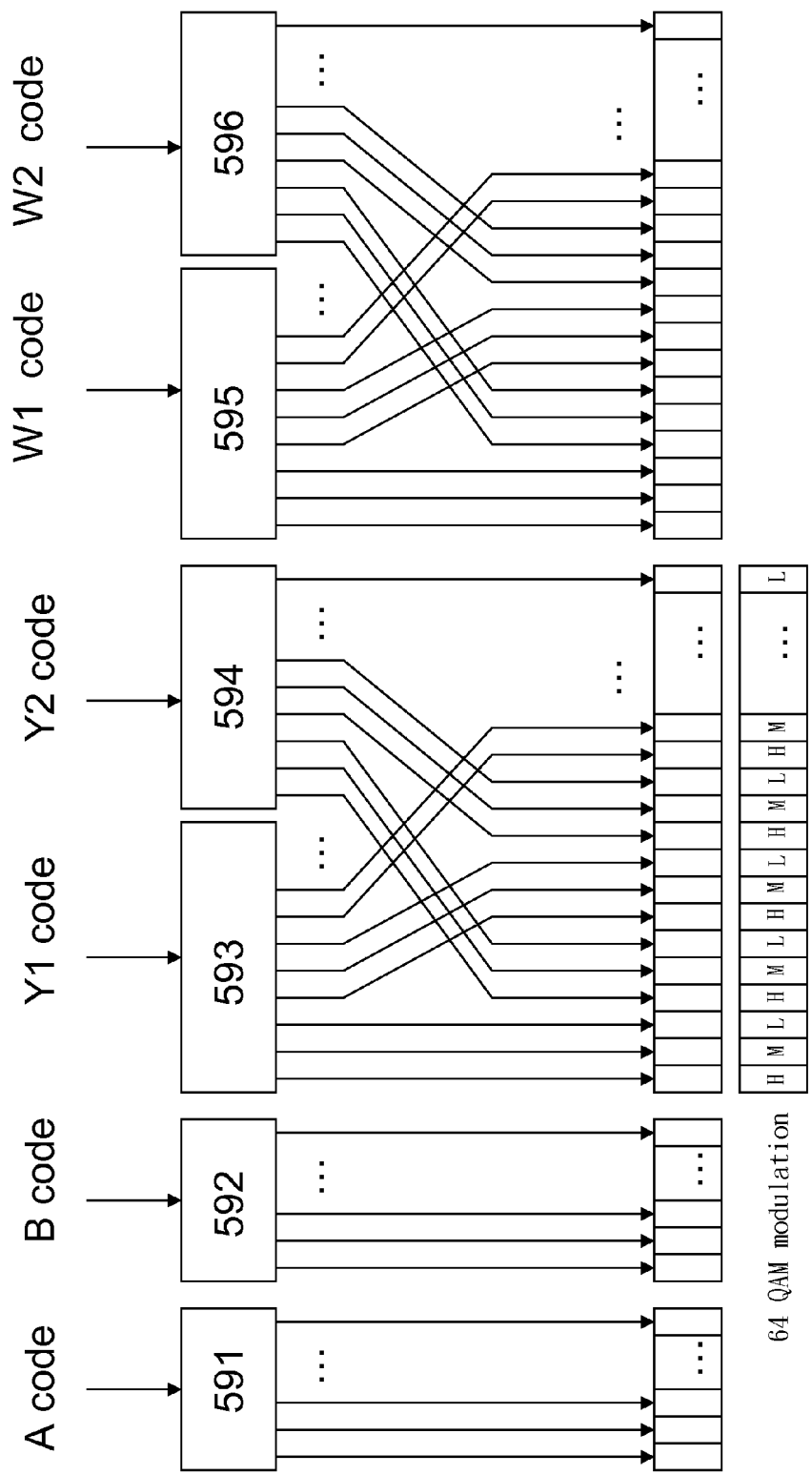
FIG. 15 illustrates a fourth example of multiplexing scheme of transmission method in accordance with the present invention.

FIG. 15 illustrates a fourth example of multiplexing scheme of transmission method in accordance with the present invention. In FIG. 15, such multiplexing scheme is applied in CTC encoder, the data outputted from the subblock interleaver 593 corresponding to Y1 code is multiplexed with the data outputted from the subblock interleaver 594 corresponding to Y2 code per 3 bits. Similarly, the data outputted from the subblock interleaver 595 corresponding to W1 code is multiplexed with the data outputted from the subblock interleaver 596 corresponding to W2 code per 3 bits. Therefore, the Y1 code, Y2 code, W1 code, W2 code under multiplexing scheme of the present invention can have more uniform reliability in transmission in 64 QAM modulation scheme.

Preferably, the data outputted from the subblock interleaver 591 corresponding to A code and the data outputted from the subblock interleaver 592 corresponding to B code can be, if necessary, multiplexed per 2 bits or 3 bits.

Figure 16:
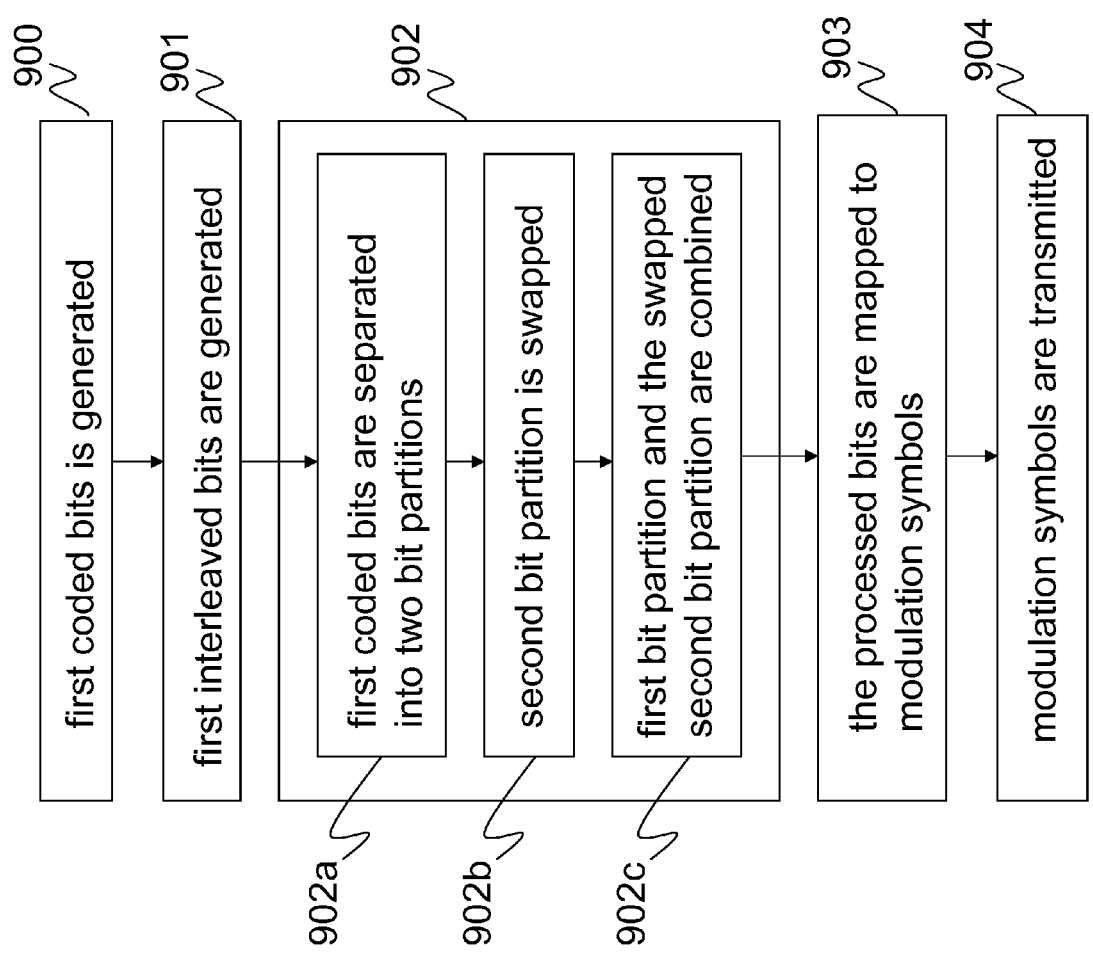
FIG. 16 illustrates a flow chart of fourth embodiment of transmission method in accordance with the present invention.
Figure 17:
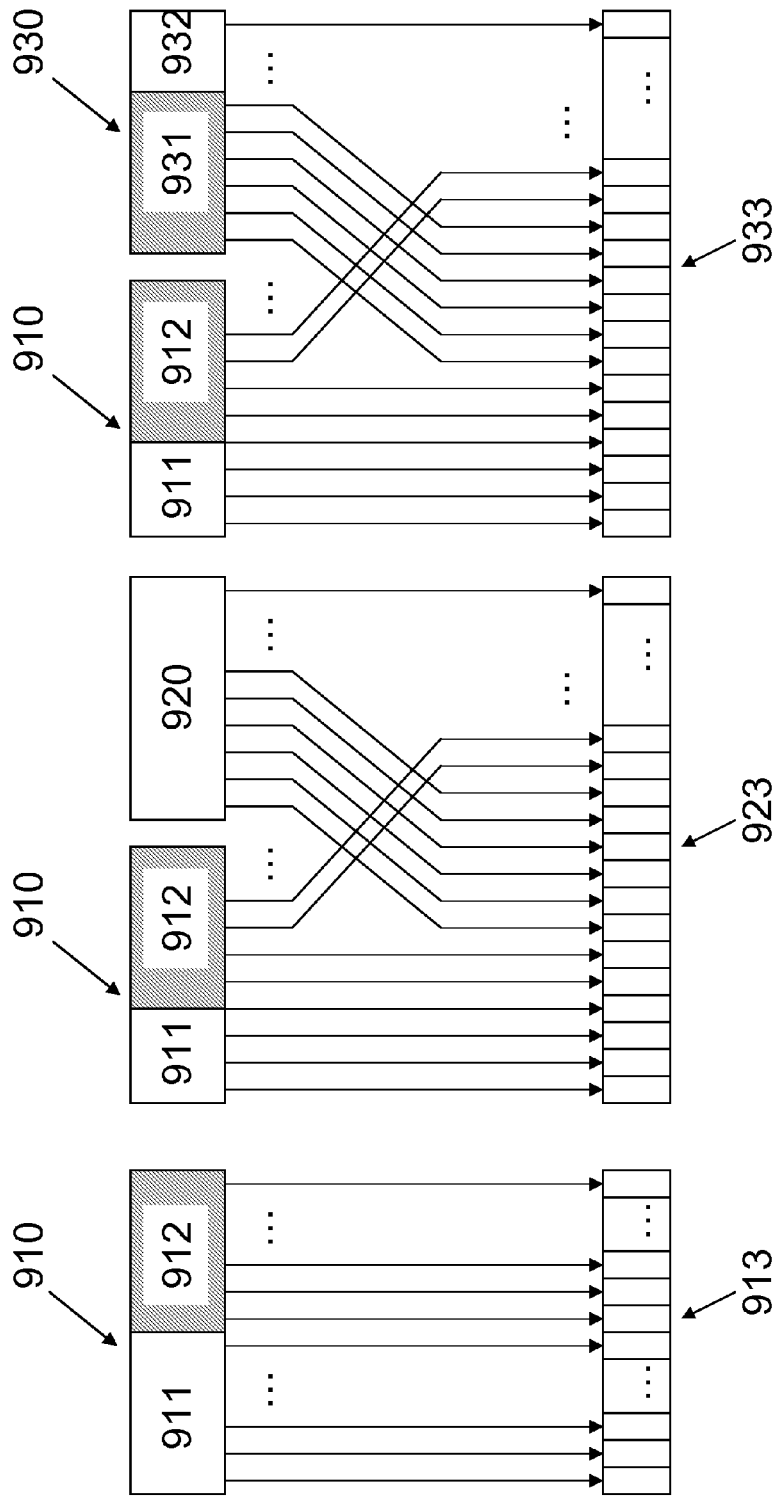
FIG. 17 illustrates a schematic view of partially swapping scheme of transmission method in accordance with the present invention.

FIG. 16 and FIG. 17 illustrate respectively a flow chart of fourth embodiment of transmission method in accordance with the present invention, and a schematic view of partially swapping scheme of transmission method in accordance with the present invention. In FIG. 16, the embodiment comprises the following steps. In step 900, input data is encoded to generate an encoded data containing first coded bits. In step 901, the first coded bits are interleaved to generate first interleaved bits, such as the interleaved bits 910 shown in FIG. 17. In step 902 the first coded bits partially swapped to generate processed bits, such as the processed bits 913 shown in FIG. 17. In step 903 the processed bits are mapped to modulation symbols in a predetermined modulation scheme and the modulation symbols are transmitted in step 904. Preferably, the step 902 can further comprise the following steps 902a, 902b and 902c. In step 902a, the first coded bits are separated into a first bit partition and a second bit partition. As shown in FIG. 17, bit partition 911 and bit partition 912 are respectively referred to first bit partition and second bit partition. The ratio of first bit partition to second bit partition is m:n, such as 1:0, 1:1 or 1:2, m and n are integer larger than or equal to zero.

In step 902b, bits of said second bit partition is swapped based on a predetermined swapping pattern to generate a swapped second bit partition. In step 902c the first bit partition and the swapped second bit partition are combined to form the processed bits.

When the encoded data contains second coded bits, this embodiment can further steps of interleaving the second coded bits to generate second interleaved bits, and then combining the partially swapped first coded bits and the second interleaved coded bits based on a predetermined multiplexing pattern, to form the processed bits, such as the processed bits 923 shown in FIG. 17.

Preferably, the second interleaved bits can be partially swapped, if necessary, to generate partially swapped second coded bits, and the partially swapped first coded bits and the partially swapped second coded bits are combined based on the predetermined multiplexing pattern, to form the processed bits. For example, bit swap is performed on the bit partition 931 of the interleaved bits 930 based on the predetermined swap pattern. The partially swapped interleaved coded bits 910 and 930 are combined based on a predetermined multiplexing pattern, to generate the processed bits. It is noted that, for easily understanding, the bit partition marked by slant lines in FIG. 17 indicates the bit partition where the bit swap is performed.

Preferably, the bit partition where the bit swap is performed can be change in retransmission. For example, when a retransmission request is received from a receiver, bits of the first bit partition is swapped based on the predetermined swapping pattern and the swapped first bit partition and the second bit partition are combined based on the predetermined multiplexing pattern, to form the processed bits. The processed bits then are mapped to modulation symbols in the predetermined modulation scheme. The modulation symbols are retransmitted to the receiver.

FIG. 18 illustrates an example of partially swapping scheme the present invention applied in the CTC encoder. A' code, B' code, Y1' code, Y2' code, W1' code and W2' code respectively represent the interleaved A code, B code, Y1 code, Y2 code, W1 code and W2 code. Blocks marked by slant lines represent bit partitions which are performed bit swap. The scheme (A) and scheme (B) are two partially swap schemes. Locations of swapped bit partition of A' code, B' code, Y1' code, Y2' code, W1' code and W2' code in two example are different, so these two scheme can be respectively applied in first transmission and retransmission.

Figure 19:
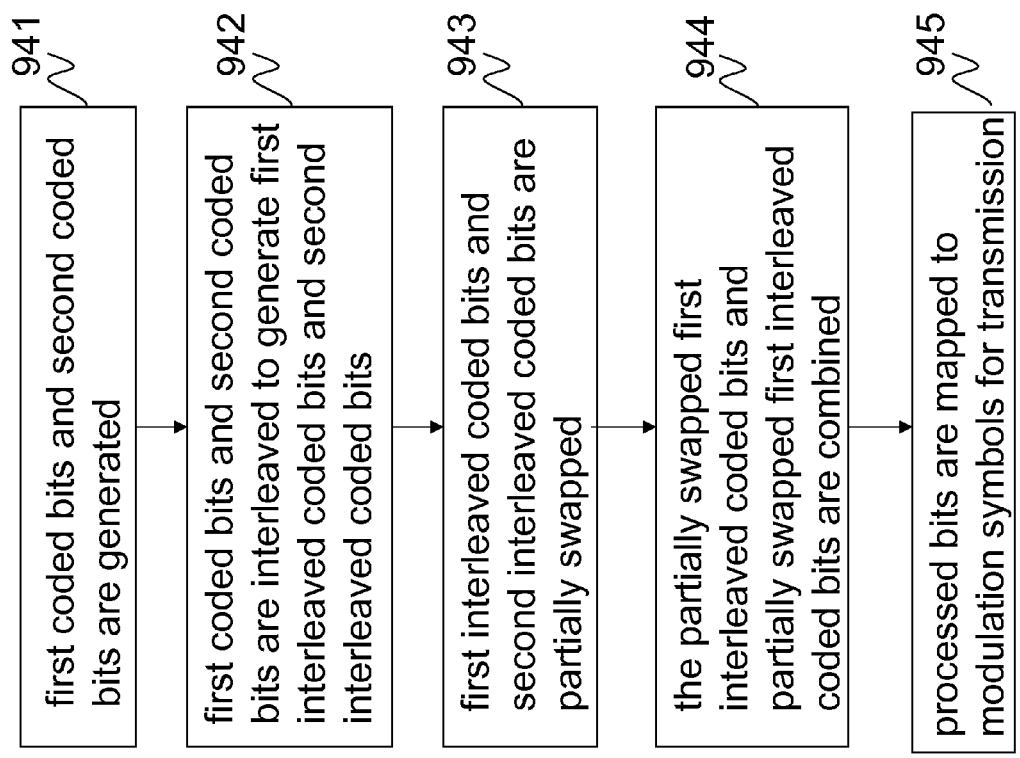
FIG. 19 illustrates a flow chart of fifth embodiment of transmission method in accordance with the present invention.

It is noted that the bit reversing scheme, bit swap scheme, bit partially swap scheme and multiplexing scheme described in four preceding embodiments of transmission method, if necessary, can be applied together for better effect. FIG. 19 illustrates a flow chart of fifth embodiment of transmission method in accordance with the present invention. In step 941 input data is encoded to generate first coded bits and second coded bits. In step 942 the first coded bits and second coded bits are interleaved respectively to generate first interleaved coded bits and second interleaved coded bits. In step 943 the first interleaved coded bits and second interleaved coded bits are partially swapped respectively. In step 944 the partially swapped first interleaved coded bits and partially swapped first interleaved coded bits are combined based on a predetermined multiplexing pattern, to generate processed bits which are then mapped to modulation symbols in a predetermined modulation scheme in step 945 for further transmission.

Figure 20:
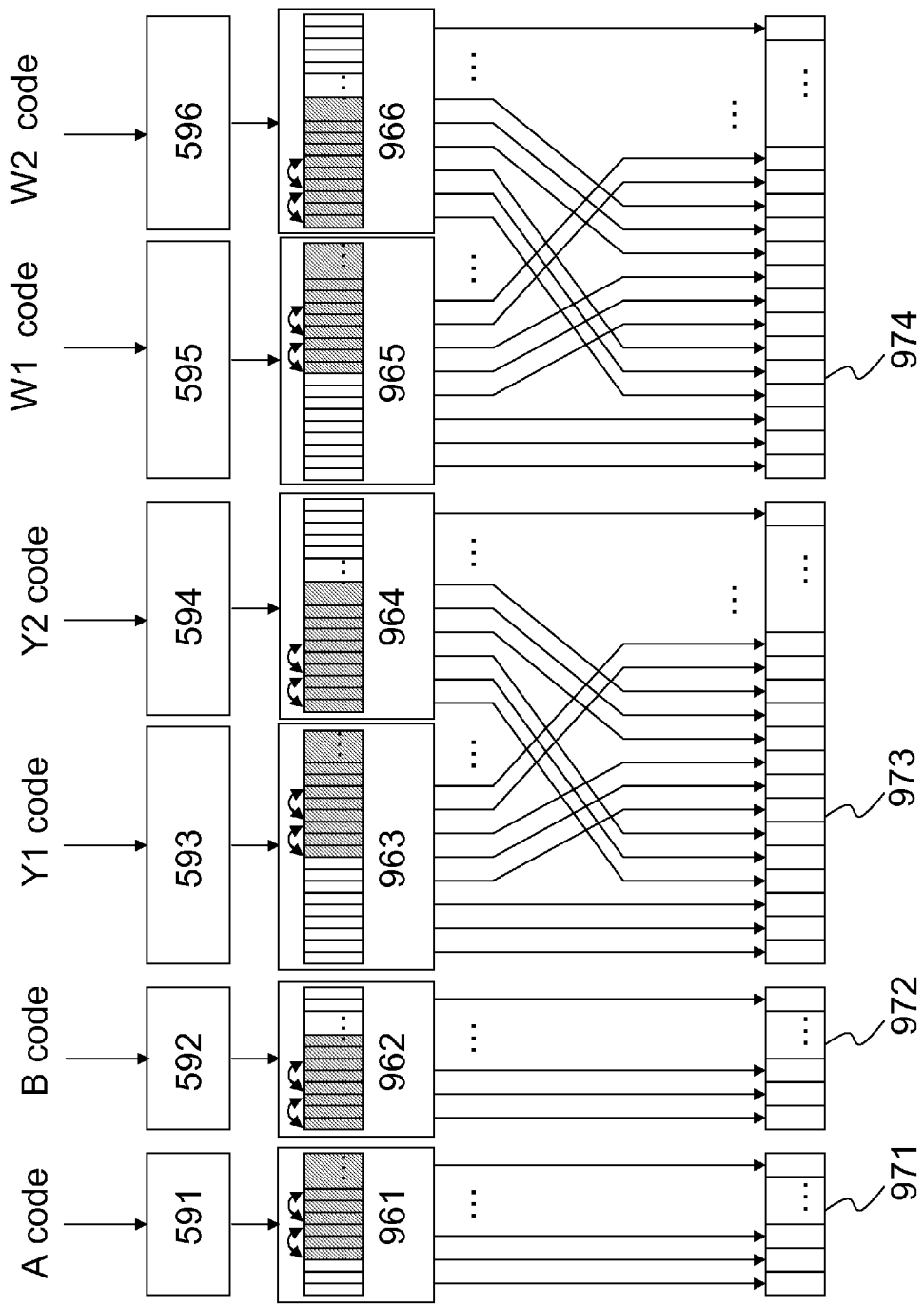
FIG. 20 illustrates an example of transmission method applied in the CTC encoder.

FIG. 20 illustrates an example of transmission method applied in the CTC encoder. In FIG. 20, the bit sequence outputted from CTC encoder are separated into A code, B code, Y1 code, Y2 code, W1 code and W2 code. A code and B code are systematic bits, and Y1 code, Y2 code, W1 code and W2 code are parity bits. A code, B code, Y1 code, Y2 code, W1 code and W2 code are fed into subblock interleaver 591, 592, 593, 594, 595 and 596 for interleaving, and the interleaved codes are performed partially swap. The blocks marked with slant lines represent the bit partitions being performed bit swap, such as the bit swap scheme example (A) shown in FIG. 9. In the block marked with slant lines, first bit is swapped with third bit, fourth bit is swapped with $6^{th}$ bit, $7^{th}$ bit is swapped with $9^{th}$ bit and such swapping rule is repeated sequentially for further bits. Partially swapped interleaved bits 961 and 962 are mapped directly as processed data 971 and 972. Partially swapped interleaved bits 963 and 964 are multiplexed based on the multiplexing scheme shown in FIG. 15, to form the processed 973. Similarly, partially swapped interleaved bits 965 and 966 are multiplexed based on the multiplexing scheme shown in FIG. 15, to form the processed 974.

Figure 21:
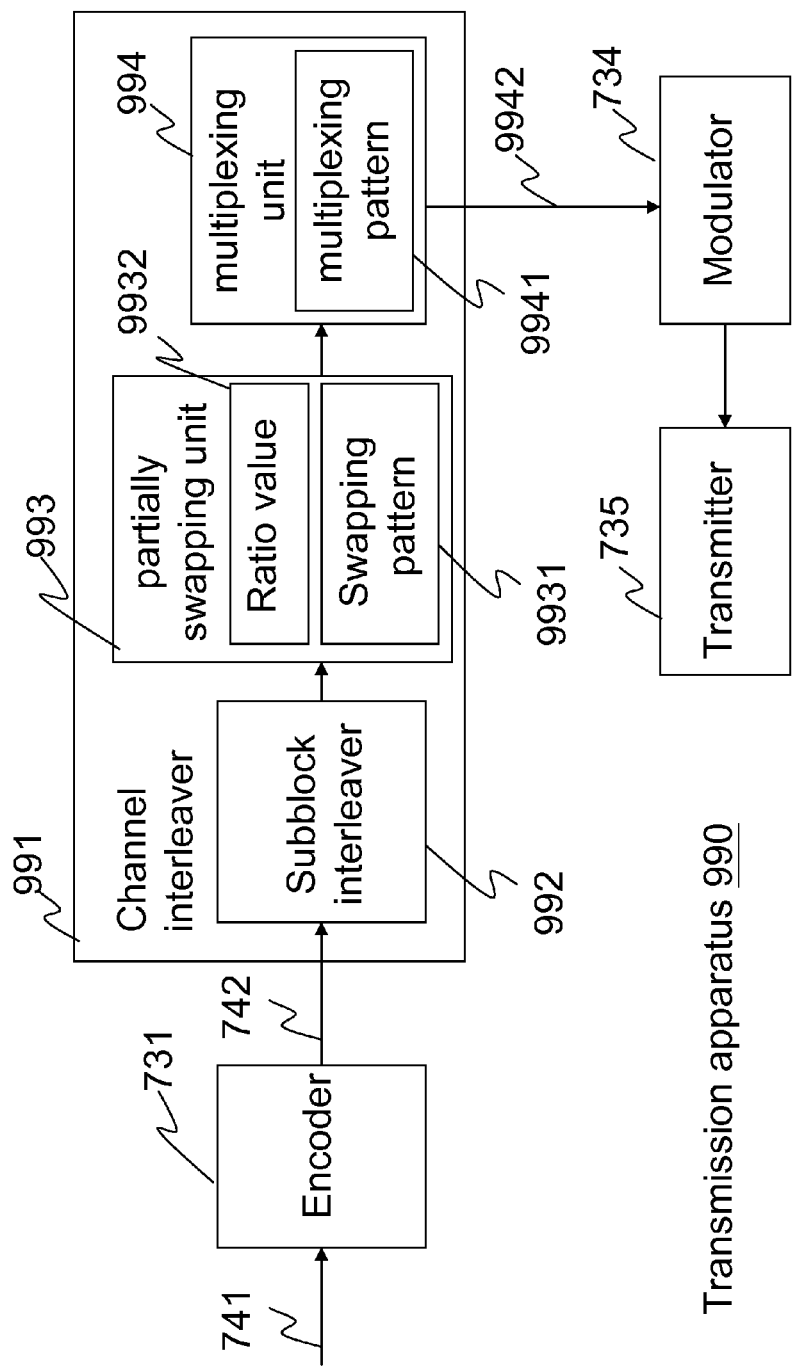
FIG. 21 illustrates a block diagram of second embodiment of transmission apparatus in accordance with the present invention.

FIG. 21 illustrates a block diagram of second embodiment of transmission apparatus in accordance with the present invention. Transmission apparatus 990 comprises an encoder 731, a channel interleaver 991, a modulator 734 and a transmitter 735. The channel interleaver 991 further comprises a subblock interleaver 992, a partially swapping unit 993 and a multiplexing unit 994. The encoder 731 is operable to encode input data 741 to generate coded bits 742. The subblock interleaver 992 is operable to interleave the coded bits 742. Based on a ratio value 9932, the partially swapping unit 993 determines location of the bit partition for bit swapping, and then the partially swapping unit 993 performs partially swap based on a predetermined swapping pattern 9931 on the interleaved coded bits outputted from the subblock interleaver 992. Multiplexing unit 994 is operable to multiplex the bits outputted from the partially swapping unit 993 based on a predetermined multiplexing pattern 9941, to generate processed bits 9942. The modulator 734 is operable to map the processed bits 9942 to modulation symbols in a predetermined modulation scheme, and the transmitter 735 transmits the modulation symbols to remote receiver.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmission method for retransmitting in a transmitter of a wireless communication system, comprising:
   transmitting a first data mapped in a QAM constellation pattern in a first transmission; and
   retransmitting a second data mapped in said QAM constellation pattern in a retransmission;
   wherein said second data is reversion of said first data;
   wherein said QAM constellation pattern is a 64 QAM constellation pattern, and said first data is a bit sequence (b5, b4, b3, b2, b1, b0) and said second data is a bit sequence (b0, b1, b2, b3, b4, b5); and
   wherein a modulation symbol of said 64 QAM constellation pattern contains 6 bits [a5, a4, a3, a2, a1, a0], and said bits [a5, a2] have a high reliability, said bits [a4, a1] have a medium reliability, and said bits [a3, a0] have a low reliability.

2. The transmission method according to claim 1, further comprising:
   mapping said first data onto a first modulation symbol based on said QAM constellation pattern, and transmitting said first modulation symbol in said first transmission;
   reversing said first data to obtain said second data; and
   mapping said second data onto a second modulation symbol based on said QAM constellation pattern, and transmitting said second modulation symbol in said retransmission.

3. A transmission apparatus capable of retransmitting in a wireless communication system, comprising:
   an encoder capable of encoding input data and outputting coded bits;
   a channel interleaver capable of interleaving the coded bits to generating interleaved bits, and reversing said interleaved bits to generate reversed bits, upon receiving a retransmission request from a receiver;
   a modulator capable of mapping said reversed bits to modulation symbols in a predetermined modulation scheme; and
   a transmitter capable of transmitting the modulation symbols to said receiver,
   wherein said predetermined modulation scheme is a 64 QAM modulation scheme, and said channel interleaver, with respect to said interleaved bits (b5, b4, b3, b2, b1, b0), reverses said interleaved bits (b5, b4, b3, b2, b1, b0) to generate said reversed bits (b0, b1, b2, b3, b4, b5); and wherein a modulation symbol of said 64 QAM modulation scheme contains 6 bits [a5, a4, a3, a2, a1, a0], and said bits [a5, a2] have a high reliability, said bits [a4, a1] have a medium reliability, and said bits [a3, a0] have a low reliability.

* * * * *